Nov. 6, 1962
W. J. RIDDLE
3,062,270
PLATFORM TREAD APPLIER
Filed Sept. 4, 1958
3 Sheets-Sheet 2
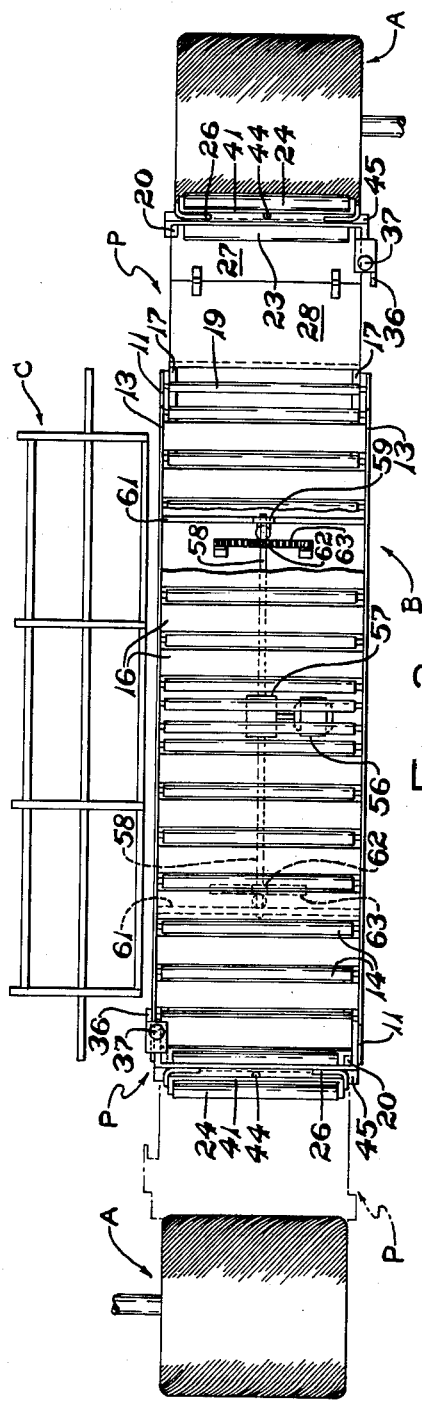
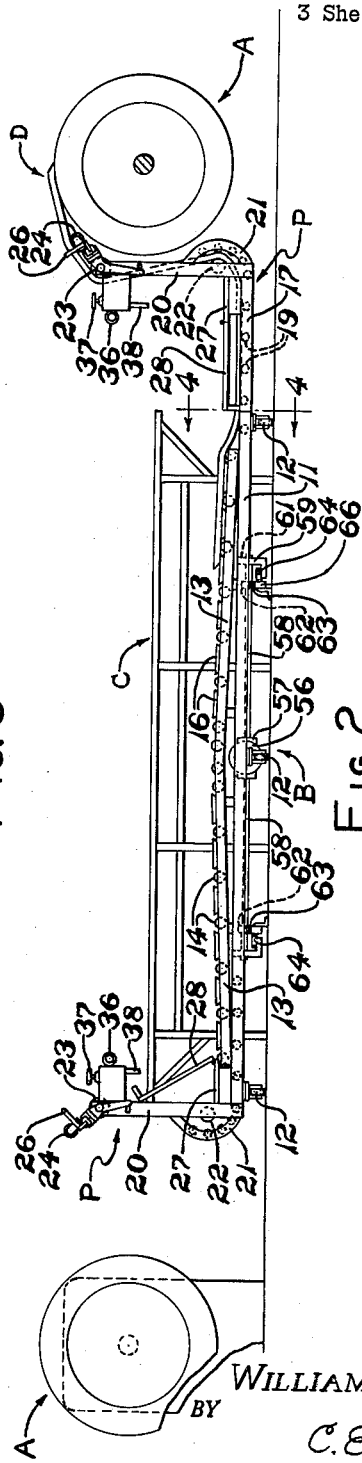
INVENTOR.
WILLIAM J. RIDDLE
BY
C. E. Tripp
ATTY.

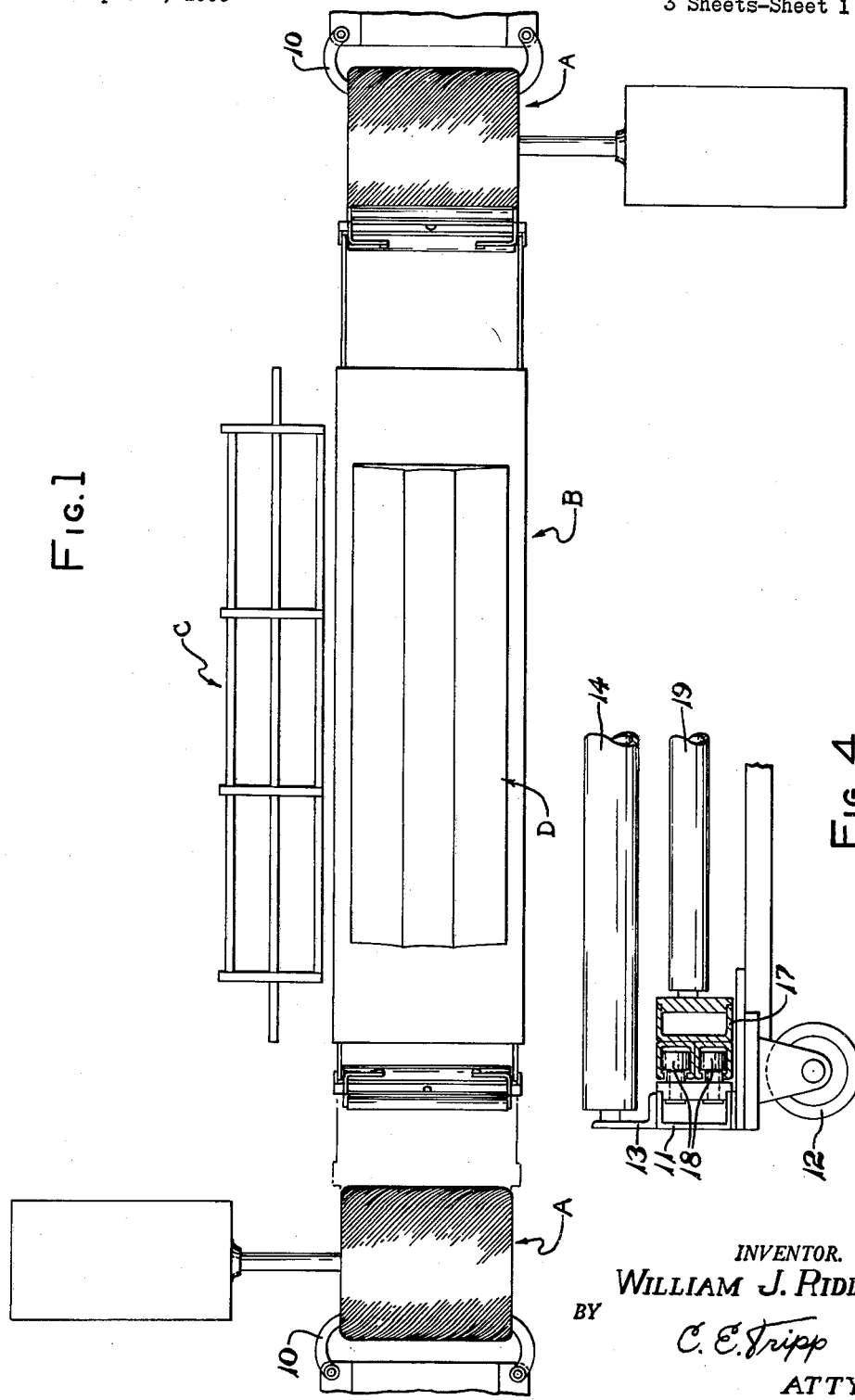

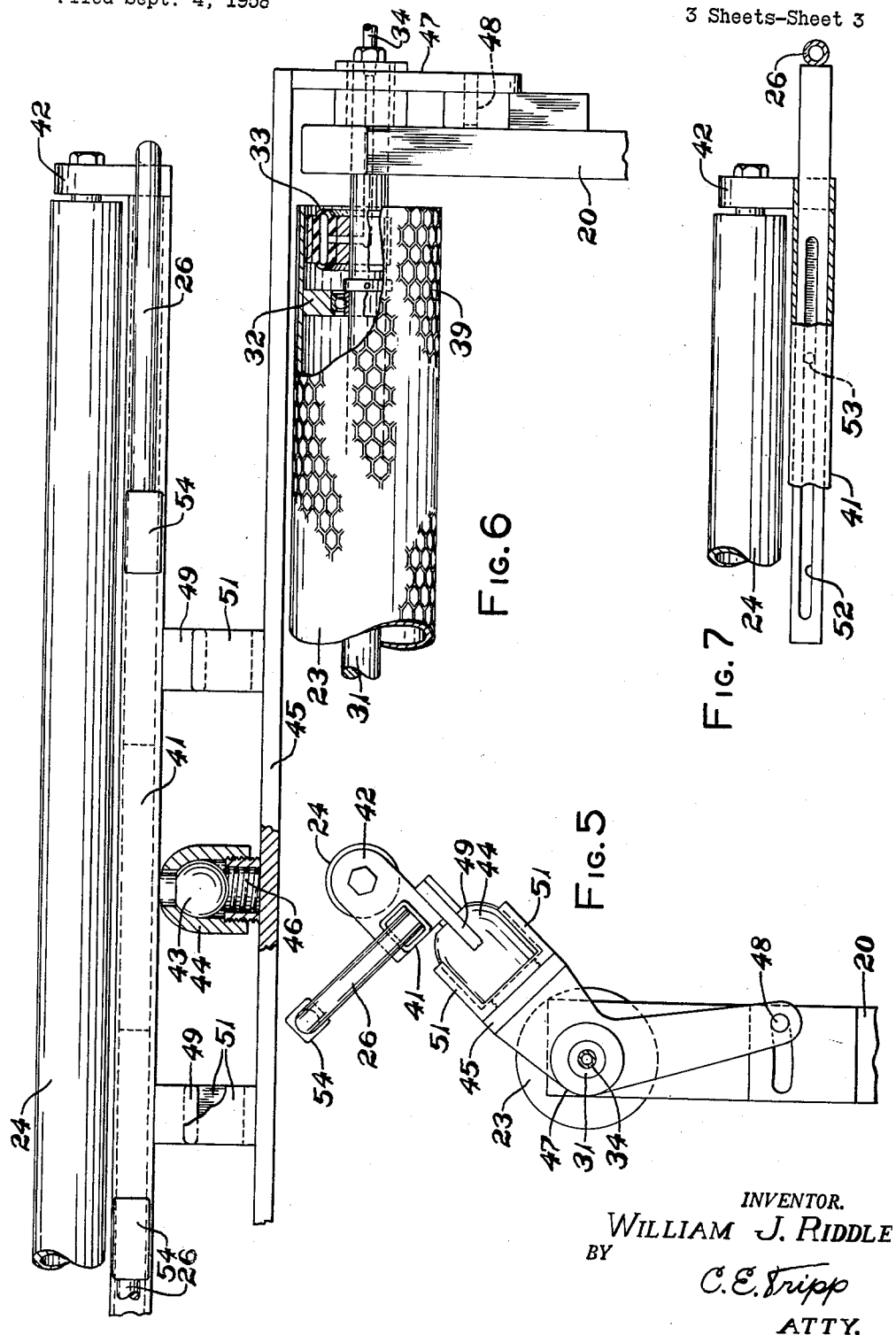

United States Patent Office 3,062,270
Patented Nov. 6, 1962

3,062,270
PLATFORM TREAD APPLIER
William J. Riddle, Cuyahoga Falls, Ohio, assignor to The B. F. Goodrich Company, New York, N.Y., a corporation of New York
Filed Sept. 4, 1958, Ser. No. 759,089
5 Claims. (Cl. 156—405)

This invention relates to the application of strips to a cylindrical drum such as one used for forming a green tire carcass disposed upon a tire-building drum and has been found to be particularly advantageous in cases wherein the strips are both heavy and shrinkable or stretchable as is the case with tread strips. This invention was developed to solve the problem of applying tread strips for making large tires, sometimes called "off-the-road" or "earth mover" tires, but those skilled in the art will appreciate that the invention is useful for the applications of strips in forming other types of tires and built-up articles. It has been found desirable to use the tread strip applying method as opposed to the tread band applying method in heavy duty constructions. First, the tread band application commonly requires the use of a roller bar for slipping the band over the carcass and centering it thereafter. These large tires have treads that may be over five feet wide, which dimensions result in physical difficulties if the tread band process is tried. Second, the tread band process tends to leave a bulge in the tread where the roller bar is slipped out after the tread has been applied causing an out of balance condition. Third, the rolling action of the bar changes the surfaces of the carcass and tread element reducing the bond that can be achieved between the two.

On the other hand, tread strip applying has likewise presented problems. The operator in this process has but one chance to see to it that the tread strip is accurately laid on the carcass. The operator must be able to handle a heavy tread strip. The operator should have a place to work in front of the tire-building drum, that is, in a position opposite to that of the stitchers and other apparatus making up the tire-building machine. The operator should be able to guide the tread over the carcass from the top of the building drum and yet should be able to control and observe the application of the tread strip. The operator should have some control over the tension of the tread strip as it is being applied, because one of the problems in this art results from the fact that tread strips after having been cut to length often change in length, and usually they shrink as time passes so that the length of tread strips encountered will vary, dependent upon the time that has elapsed between the cutting of the strip and the application thereof.

Briefly, the preferred embodiment of this invention comprises a low, caster mounted, roller conveyor platform of sufficient length to receive and support the longest tread element to be applied. At one end is an extendable section that carries a hinged operator's platform, a tread tension roll and a guide roller. A similar section is provided at the opposite end to adapt the equipment for use with either of two tire-building machines positioned at opposite ends of the applier. The arrangement is such that the operator can stand on this extendable section with the tread strip moving out from beneath his feet and then vertically upward between him and the building drum to the top of the drum. A tension roller over which the tread strip passes is supplied wtih a manually adjustable brake so that tension can be applied to stretch the strip as required so that the ends will fit accurately together. A guide roller provided with handles that can be comfortably grasped by the operator and pivotally mounted provides one means by which the operator can guide the lay of the tread strip during its application. Also, the entire platform assembly is mounted so that it may be moved sideways or axially relative to the drum during application of the tread strip. Switches mounted in the handles of the guide roll control a reversible motor drive so that the sideways or axial motion of the entire platform can be directed by the operator at the same time that he is swiveling the guide roller. All of these features combine to make it possible for the operator to precisely apply the tread strip to the tire carcass.

The manner in which these advantages may be obtained will be apparent to one skilled in the art, from the following detailed description of a preferred embodiment of the invention.

In the drawings:
FIG. 1 is a general plan layout of an installation embodying the invention.
FIG. 2 is a side view of the tread applier assembly.
FIG. 3 is a plan view thereof.
FIG. 4 is a section taken on 4—4 of FIG. 2 showing the mounting for the extendable platform.
FIG. 5 is a side view showing details of the control assembly.
FIG. 6 is a plan view thereof.
FIG. 7 is a fragmentary view of the control handle mounting.

Referring to the layout of FIG. 1, two tire-building drums A are shown as being served by the apparatus of this invention. The tread applier and extendable platforms are indicated at B. To one side of the main tread applier platform is a tread board table C. The tread strips such as that at D are extruded in the tread room, cut to length and placed by an attendant on the tread board table C as required by the operator. The tread strips are then shifted from the tread board table to the platform, but as they are heavy the operator may not be able to center them on the platform. This is one of the reasons for making the platform movable sideways in order to initially center the tread strip on the carcass. Stitchers 10 (FIG. 1) commonly provided as part of the tire-building machine block access to the building drum from the rear thus making it necessary to apply the tread strips from the front. As best seen in FIGS. 2 and 3, the platform tread applier is based upon a pair of side rail frame members 11. The entire structure is supported on three sets of wheels 12 arranged for lateral motion. It has been helpful to have the actual tread-supporting platform inclined in the direction of application of the tread. To this end oppositely inclined side rails 13 are provided, which carry horizontal rollers 14 and filler plates 16 on which the operator can walk. As mentioned above, an extendable platform assembly P is fitted to each end of the main platform. This platform has rails 17 that telescope in the main platform rails 11 with the sliding motion of this platform being facilitated by mounting the sliding rails 17 on rollers 18.

In order to conduct the tread from the main platform up to the tire-building drum, a series of small rollers 19 is fitted to the platform assembly. The platform assembly has at its extremity a pair of pillars 20 for supporting the tension and guiding structure mentioned. The platform assembly includes a curved section of rolls 21 that skirts an idler roll 22 so that the tread strip D is properly directed from its horizontal position to its vertical position. Close to the top of the tire-building drum is arranged a tension roller 23 about which the tread strip passes en route to the guide roller 24. A pair of control handles 26 are connected to manipulate the pivotally mounted guide roller 24. The extendable platform P is also provided with an auxiliary platform 27 and 28 which bridges the tread conveying portion and provides a place for the operator to stand in an advantageous position to observe and control the run-on of the tread strip. A portion of the auxiliary platform 27 is fixed to provide mounting for a foot switch or switches to control the rotation of the building drum. Another portion 28 is hinged to permit it to be swung upward to provide required clearance so that the extendable platform can be retracted into the main platform when the tread applier is not in use and thus give working space immediately in front of the drum for the operator when he is engaged in other tire-building operations. With this arrangement all that is required is that a platform be provided to prevent the operator from standing on the tread strip as it is advanced in its horizontal position. Thus a fixed platform 27 and a hinged platform 28 are fitted above the rails 17. It is upon these that the operator stands when the retractable platform is extended. As seen at the left of FIG. 2 the hinged platform arrangement permits the retractable platform to be retracted so that the operator can stand facing the tire-building drum in order that he might apply the carcass.

Referring more specifically to FIGS. 5 and 6, it will be seen that a shaft 31 mounts the tension roller 23 by means of hubs 32. Revolution of the tension roller is controlled by an expander-tube brake assembly 33, which is brought into play by admission of air under controlled pressure through air inlet line 34.

The degree of application of the brake determines the stretching action on the tread strip as the tire-building drum pulls it around tension roller 23. This application of the brake is controlled by the operator by adjustment of air pressure regulator 37 and observation of the pressure gage 36. The air supply for the pressure regulator is indicated at 38. In order that the tension roller 23 may function to retard application of the tread to the tire carcass and hence introduce a predetermined stretch to the tread, the tension roller 23 is preferably provided with an expanded metal cover 39 that increases the frictional engagement between the tension roller and the tread strip.

The guide roller 24 is supported by means of a bar 41 and ears 42. To provide the desired swivel action, a ball 43 is attached to the mounting bar 41. This ball rides in a socket 44 mounted on a cross bar 45 and a spring 46 presses the ball in its socket. To provide a means of adjusting the guide roller 24 to the best position relative to the building drum A as different diameter drums are used, the cross bar 45 is pivoted about cross shaft 31 which in turn is supported by uprights 20. Crank arms 47 to which cross bar 45 is fastened engage clamp bolts 48 to enable the crank arms to be held in the desired position. To assure that guide roller 24 will not be caught between building drum and tread strip during application, stop plates 49 welded to cross bar 41 extend downward between pairs of striker plates 51 which extend upward from cross plate 45 so as to provide stops to limit the swing of roller 24 in all directions.

The control handles 26 for guide roller 24 are shown in FIG. 6 in their inward position which provides a comfortable spread of grip for the operator. To clear the roller so as to avoid interference with the initial placement of the tread strip over the roller, the handles are made to slide outwardly. This is accomplished by making the cross bar 41 of square tubing to serve as a slide for the square bars that form the lower portion of the handles. A removable pin 53 in the tubing slides in a slot in the square bar to limit the outward travel. The upper portion of the handles are of round tubing to provide passage for electrical wires connected to the control switches 54 located at the inward ends of the handles.

It has been mentioned that lateral shifting of the tire platform is important. This shifting is controlled by micro-switches 54, one for each handle 26, these switches being wired respectively to control right and left motion of the platform. The aforesaid platform motion is engendered by a drive motor 56 connected to a speed reducer 57 which turns twin shafts 58. The ends of these shafts are anchored in pillow block bearings 59 suspended by rails 61 attached to the side frame elements 11. The pair of pinions 62 mounted on shafts 58 engage racks 63 which racks are fixed to the floor.

To prevent endwise shifting of the platform B, a roller 64 at each rack presses against a combination support and guide bar 66 that mounts the rack from the floor.

In operation, the tread strip, cut to length, is laid on the tread board table C. The operator then shifts the tread strip to his tread applier platform B and threads it up and around rollers 22 and over rollers 23 and 24. This is not too difficult a task even with a large size tire tread and the act is facilitated by the fact that the platform B has sections that are somewhat inclined. The operator then presses the leading edge of the tread strip against the green carcass on the tire-building drum and by means of conventional controls such as a foot pedal (not shown) initiates drum rotation so as to draw the tread strip around the tension roller to the top of the drum. The operator will have set the pressure regulator to adjust the force of the brake for the tension roller in accordance with his measurement of the tread strip length prior to application and his knowledge of the length required by the carcass. The operator will grasp the handles 26 and guide the tread strip precisely on to the carcass while at the same time he might depress one of the lateral control switches to move the platform, as required. It often occurs that lateral motion of the platform proper is only necessary to initially align the tread strip with the drum.

As is evident from FIG. 1, the extendable platform P at the opposite end is retracted to permit another operator to be at work applying plies and the like at the other tire-building drum.

The embodiments of the invention in which an exclusive property or privilege is claimed are defined as follows.

I claim:

1. Apparatus for applying a strip of tire tread stock to a tire building drum adapted to have a tire larger than a passenger car tire built thereon, said apparatus comprising a frame including means to movably support said strip for passage in the direction of its length to the drum and between the latter and an operator building a tire upon the drum, a strip tension roll rotatably mounted on said frame in position for passage thereover of the strip, operator actuated means supported on said frame at a location accessible to said operator while applying the strip to the drum to adjustably brake said strip tension roll, a strip guiding roll rotatably mounted on said frame in a position for passage thereover of the strip as it moves from said tension roll between the operator and the drum, the mounting for said guiding roll including pivot means permitting movement of the axis of said guiding roll angularly relative to the axis of said tension roll, and handle means conveniently accessible to the said operator and connected with the mounting means for said guiding roll for shifting the latter about the said pivot means to thereby alter the path of movement of the strip as the operator applies it to the building drum.

2. Apparatus for applying a tread strip to a tire carcass larger than that employed for passenger cars while the carcass is on a tire building drum, said apparatus comprising a frame including means to movably support said strip for travel in the direction of its length to the drum and between the latter and an operator building a tire upon the drum, a tread strip tension roll rotatably mounted on said frame in position for passage thereover of the tread strip, operator actuated means supported on said frame at a location accessible to said operator while applying the strip to the drum to adjustably brake said strip tension roll, a tread guiding roll rotatably mounted on said frame in a position for passage thereover of the strip as it moves from said tension roll in a path extending between the operator and said drum, the mounting for said guiding roll including pivot means permitting movement of the axis of said guiding roll angularly relative to the axis of said tension roll, means for moving said frame axially relative to said drum, manual means conveniently accessible to said operator and connected with the mounting means for the said guiding roll for shifting the latter about the said pivot means to thereby alter the path of movement of the tread strip as it is applied to the building drum, and means actuatable by said manual means for effecting operation of said frame moving means simultaneously with manipulation of said tread guiding roll.

3. Apparatus for applying a flexible strip of tire tread stock about the outer annular surface of either of a pair of rotatable tire building drums adapted to have tires larger than passenger car tires built thereon which drums are disposed in spaced relationship with their axes parallel and with the said apparatus therebetween, the said apparatus comprising a roller conveyor for movably supporting the said strip and advancing it lengthwise toward either of said drums, an operator strip-applicator platform mounted at each end of said conveyor for movement relative to the conveyor to and from an adjacent one of said drums and with each platform located above the path of travel of the strip to the adjacent drum, each strip-applicator platform comprising a strip tension roll rotatably mounted on said platform in a position for passage thereover of the strip on said conveyor, operator actuated means supported on said platform at a location accessible to the operator while applying the strip to a drum to adjustably brake said strip tension roll, a strip guiding roll rotatably mounted on said strip-applicator platform in a position for passage thereover of the strip between the operator and the adjacent drum, the mounting for said guiding roll including pivot means permitting movement of the axis of said guiding roll angularly relative to the axis of said tension roll, manual means connected to the mounting for said guiding roll to control the angular position of the latter, means mounting said conveyor and platforms for motion parallel to the axis of said building drums, and means to control the motion of said conveyor and platforms simultaneously with manipulation of said manual means for controlling the position of said tread guiding roll.

4. An apparatus for applying a flexible strip to a tire building drum adapted to have tires larger than passenger car tires assembled thereon, said apparatus comprising an elongated platform provided with a means for supporting a flexible strip thereon for movement longitudinally of the platform, means for effecting movement of the said platform axially relative to said drum, an operator's station supported on said platform at one end thereof for positioning adjacent said drum, the said station including a supporting portion for the operator with means to conduct the said strip therebeneath, a strip tension roll rotatably mounted upon said apparatus for passage thereover of said strip as it moves past said operator's station, operator controlled means accessible to the operator at said station to selectively brake said tension roll, a strip guiding roll rotatably supported on said apparatus at said operator's station between said tension roll and said drum for passage of said strip over the guiding roll as the strip moves between the said station and drum with the support for said guiding roll including pivot means permitting movement of the axis of said guiding roll angularly relative to the axis of said tension roll, handle means accessible to an operator at said station and connected to said guiding roll for manually moving said guiding roll about said pivot means, and operator actuated means at said operator's station and accessible to the operator while employing said handle means to also control axial movement of said platform while controlling the angular position of said guiding roll.

5. An apparatus for applying a flexible strip to a tire building drum adapted to have tires larger than passenger car tires assembled thereon, said apparatus comprising an elongated platform provided with a means for supporting a flexible strip thereon for movement longitudinally of the platform in a generally horizontal path, electrical power means for effecting movement of said platform axially relative to said drum, an operator's station supported on said platform at one end thereof for positioning adjacent said drum, the said station including a supporting portion for the operator with means to conduct the said strip therebeneath and into a generally vertical path between said station and drum, a strip tension roll rotatably mounted on said apparatus in position for passage of said strip over said tension roll as the strip is moved past said operator's station, operator controlled means accessible to the operator at said station to selectively brake said tension roll, a strip guiding roll rotatably supported at said operator's station between said tension roll and said drum for passage of said strip over the guiding roll as the strip moves between said station and drum with the support for said guiding roll including pivot means permitting movement of the axis of said guiding roll angularly relative to the axis of said tension roll, handle means readily accessible to an operator at said station and connected to said guiding roll for manually moving the latter about said pivot means, an operator actuated switch means at said operator's station for controlling said electrical power means and permitting operator control of axial movement of the platform while manipulating said handle means.

References Cited in the file of this patent

UNITED STATES PATENTS

| | | |
|---|---|---|
| 2,232,487 | Smith | Feb. 18, 1941 |
| 2,258,350 | Bostwick | Oct. 7, 1941 |
| 2,343,954 | Carlin | Mar. 14, 1944 |
| 2,346,439 | Leguillon | Apr. 11, 1944 |
| 2,418,783 | McChesny | Apr. 8, 1947 |
| 2,471,140 | Breth | May 24, 1949 |
| 2,473,067 | Miller | June 14, 1949 |
| 2,588,207 | Cleland et al. | Mar. 4, 1952 |
| 2,627,296 | Secrest | Feb. 3, 1953 |
| 2,668,572 | Bostwick | Feb. 9, 1954 |

OTHER REFERENCES

"Web Guiding Control," S. E. Amos.
"Machine Design," September 1951, pages 159–162.